Jan. 8, 1957 R. M. CARRIER, JR 2,776,741
DISCHARGE GATE

Filed Nov. 18, 1953 2 Sheets-Sheet 1

INVENTOR.
ROBERT M. CARRIER, JR.
BY
Oberlin + Limbach
ATTORNEYS.

INVENTOR.
ROBERT M. CARRIER, JR.
BY
Oberlin & Limbach
ATTORNEYS

United States Patent Office 2,776,741
Patented Jan. 8, 1957

2,776,741

DISCHARGE GATE

Robert M. Carrier, Jr., Louisville, Ky., assignor to Carrier Conveyor Corporation, Louisville, Ky., a corporation Application November 18, 1953, Serial No. 392,932

6 Claims. (Cl. 198—220)

The present invention relates generally as indicated to a discharge gate and more particularly to a discharge gate for trough-type or like conveyors which, in its closed position, spans an opening in the conveyor and forms a part of the material supporting and conveying surface thereof, and which, in its open position, permits the conveyed material to be discharged through such opening.

It is one primary object of this invention to provide a discharge gate for conveyors and the like which, when in its closed position, has opposite edge portions respectively forwardly overlying and rearwardly underlying opposite edge portions of the conveyor opening aforesaid so that the conveyed material moves in a direction away from these lapping points between the gate and the conveyor opening.

It is another object of this invention to provide a discharge gate for conveyors and the like which is tiltable from closed position to open position and which has an over-center spring means associated therewith effective to retain the gate in both closed and open positions.

It is another object of this invention to provide a discharge gate for conveyors and the like which is operated by a linkage effective to lock the gate in closed position without danger of accidental opening due to load of conveyed material thereon and without objectionable flapping or rattling thereof as when the gate is used on a vibrating conveyor.

Another object of this invention is to provide a discharge gate for conveyors and the like in which the operating linkage therefor is arranged so that a substantial portion of the conveyor opening is available for the discharge of the conveyed material while yet, when the gate is in its closed position, the load of the conveyed material passing thereover will not cause inadvertent movement of the gate to its open position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

Figure 1:
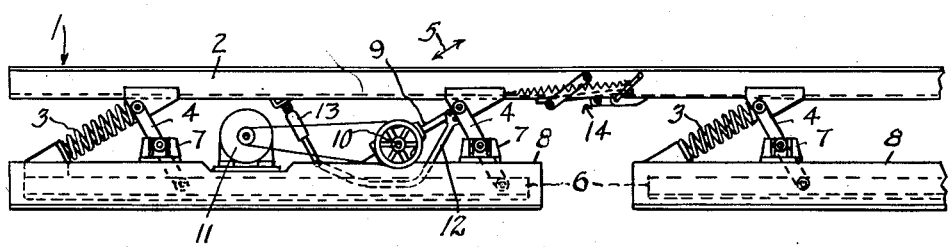
Figure 2:
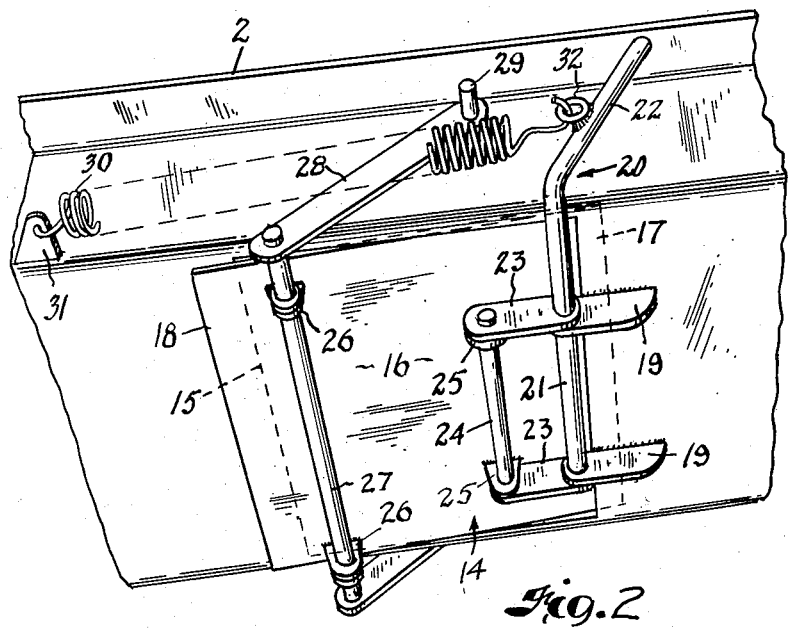
Figure 3:
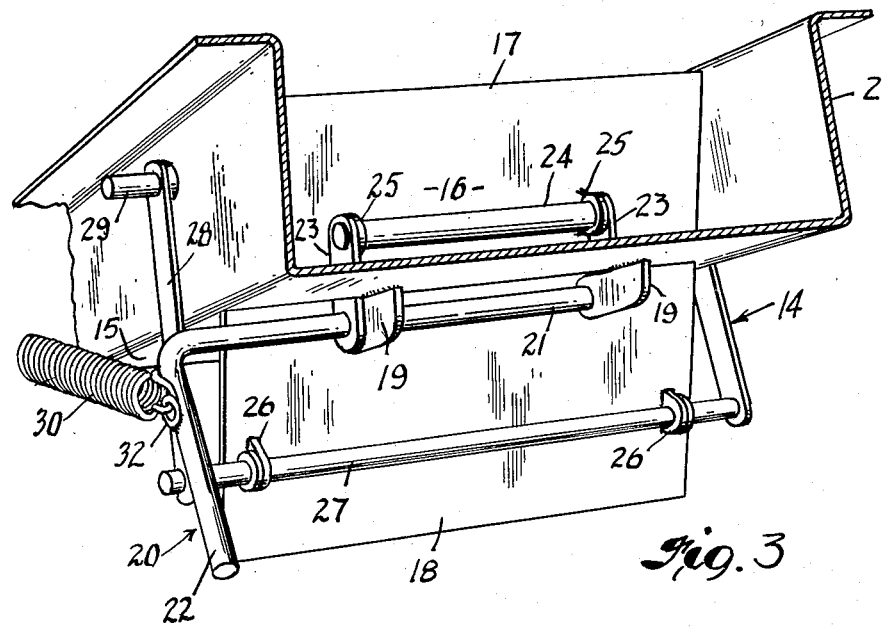
Figure 4:
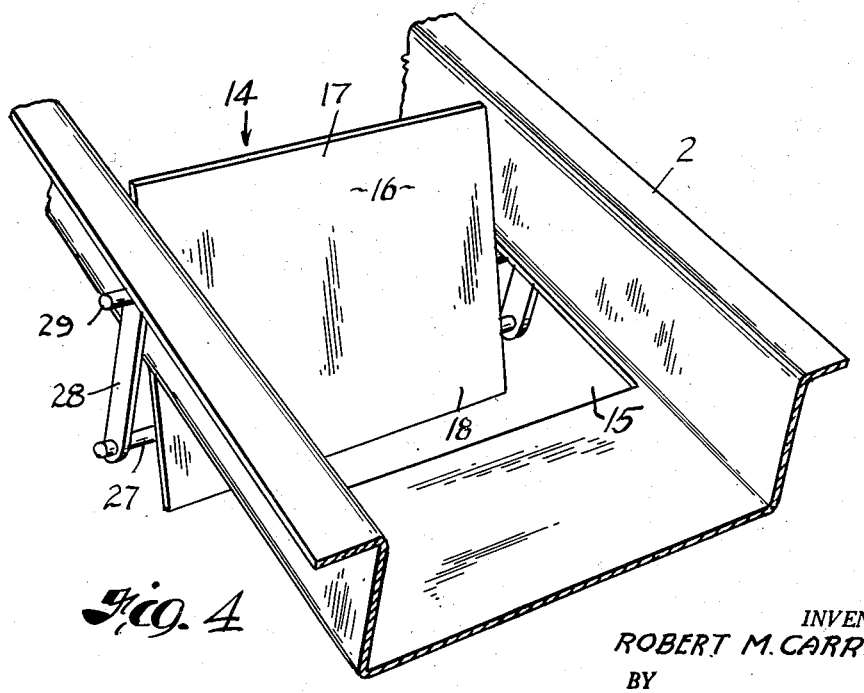

In said annexed drawings:

Fig. 1 is a side elevation view of a trough-type vibrating conveyor with the present discharge gate disposed between the ends of the conveyor trough; and Figs. 2 to 4 are perspective views, on enlarged scale, showing that portion of the conveyor trough which is provided with the present discharge gate, Fig. 2 showing the discharge gate in its closed position, and Figs. 3 and 4 showing the discharge gate in its open position.

Broadly stated, the present invention comprises a conveyor which has a discharge passage between the ends thereof, a gate for closing said passage, and a linkage connecting said gate to said conveyor for tilting movement from passage-closing position to passage-opening position. In its more specific form, the linkage aforesaid serves also to lock the gate in its passage closing position. This invention also contemplates the dimensioning of the gate so that opposite edges thereof respectively overlie and underlie opposite edge portions of the conveyor passage so that the conveyed material moves along the conveyor and the gate in a direction away from the aforesaid overlapping joints to thus eliminate the problem of leakage of the conveyed material.

Referring now more particularly to the drawings and first to Fig. 1, the conveyor 1 shown herein for purposes of illustration only, comprises a trough 2 supported on coil springs 3 and arms 4 for vibration along the path indicated by the arrow 5. The arms 4 are pivotally connected (rubber bushed connections preferably being employed) to said trough 2 at one end and similarly pivotally connected at the other end to counterbalancing members 6. Said arms 4 are pivotally connected, again by rubber bushings, intermediate their ends to journal blocks 7 of base members 8.

Vibration of trough 2 in synchronism with the natural frequency thereof is effected as by means of the connecting rod 9 connected to said trough 2 as hereinafter explained and to an eccentric 10, the latter being mounted on base member 8 and driven as by means of an electric motor 11.

In order to permit displacement of said trough 2 on its spring mounting under the influence of variable loads of conveyed material thereon, said connecting rod 9 is pivotally connected by a rubber bushing, to an arm 12, which arm in turn is pivotally connected, also by rubber bushing, to trough 2 at one end and to a hydraulic shock absorber 13 at its other end, said shock absorber being pivotally connected to said trough 2. As apparent, when an increased load is placed upon the trough 2, the latter can gradually settle on its spring mounting through a counter-clockwise rotation of the arm 12, and consequent shortening of the length of the hydraulic shock absorber 13, such settling of trough 2 occurring without transferring the settling load to the connecting rod 9 and eccentric 10. However, at operating frequency, the shock absorber 13 resists, with high degree of force, any tendency to substantially extend or contract the same whereby positive, uniform amplitude energy impulses are transmitted by eccentric 10 to the trough 2, through the connecting rod 9 and the arm 12 and thus vibration of the trough does not dampen under load. Likewise, when the conveyor is operated empty, the amplitude of vibration will not increase to destructive proportions. In addition, because this is a natural frequency apparatus, the magnitude of the energy impulses required to be delivered to the trough are only about 10% or less than would otherwise be required in a non-spring-mounted trough or in a spring-mounted trough operated at a frequency other than the natural frequency of its spring mounting. The counterbalance members 6 are, as apparent, vibrated in phase opposition to the vibration of trough 2, and therefore the apparatus is balanced so that vibrations are not transmitted to the base members 8 and to the building structure.

The conveyor structure just described is to be regarded merely as typical insofar as the essential features of the present invention are concerned, because it is immaterial what particular mechanism supports the conveyor for vibration and what particular means are employed for delivering energy impulses to the conveyor.

In Fig. 1, the reference numeral 14 denotes the entire discharge gate assembly which will now be described in detail in connection with the perspective drawings, Figs. 2, 3, and 4.

Referring now to Figs. 2, 3, and 4, the bottom of the trough is formed with a rectangular opening 15 therethrough, and if desired, several such openings may be provided at desired longitudinally spaced points along the conveyor trough 2. If necessary, the base members 8 are interrupted under such openings so that bins, hoppers, carriages, or the like may be positioned thereunder to receive the discharged material. In fact, in some instances, boxes or hoppers are attached directly to said trough 2 for vibration therewith and the lower ends of such boxes or hoppers have flexible socks connected thereto which lead into suitable bins or the like.

The gate itself is in the form of a rectangular plate 16 which, except when conveying liquids, is of width approximately the same as the width of the opening 15 and of length greater than the length of the opening so that the end portions 17 and 18 respectively forwardly overlie and rearwardly underlie the corresponding edge portions of the opening 15.

In the form of the invention shown in Fig. 1, material will be conveyed from left to right; and, as best shown in Fig. 2, such direction of conveying of the material is away from the joints between the overlying and underlying portions 17 and 18 whereby such joints need not be tightly sealed when conveying granular, lumpy, or other similar material. The opposite sides of said plate 16 are, of course, preferably fairly closely fitted between the sides of the opening 15 so as to prevent leakage, even of fine powdered materials.

When the conveyor is used for conveying liquids, the plate 16 will be formed so that its opposite sides from the middle thereof to the end portion 18 will underlie the opposite side portions of the opening 15 and so that the side portions from the middle thereof to the overlying portions 17 will overlie the opposite sides of the opening 15 and suitable gaskets will be secured either to the trough 2 or to the plate 16 to form a fluid-tight seal between such overlying and underlying side and end portions of said plate and trough opening.

The mechanism for tilting or swinging the plate 16 from its passage closing position as shown in Fig. 2 to its passage opening position as shown in Figs. 3 and 4 comprises a pair of ears or brackets 19 welded to the bottom of said trough 2 adjacent the forward edge of the opening 15, or in other words, the edge of the opening which the portion 17 of the plate 16 overlies, and pivotally connected to said brackets 19 is a bell crank lever 20 which has a shaft portion 21 rotatable in the brackets 19, a handle portion 22 which is bent from said shaft portion to extend alongside the trough 2, and paired short links 23 which are welded or otherwise secured to the shaft portion 21 and which are secured together by means of a rod 24. Said rod 24 is, in turn, rotatably mounted in ears 25 which are secured as by welding to the underside of the plate 16 at a point closer to the overlying edge portion 17 than to the underlying portion 18 whereby when said bell crank lever 20 is rotated in a clockwise direction as viewed in Fig. 2 so that said links 23 are swung from horizontal to substantially vertical position, the overlying portion 17 of the plate will be swung upwardly with respect to the bottom of trough 2 and the plate 16 will thus be tilted to provide a relatively large-size opening for discharge of material.

Plate 16 has welded or otherwise secured on its underside, a pair of ears 26 which are located adjacent the underlying portion 18 of the plate, and preferably rather close to the corresponding edge of the opening 15, for a purpose which will become apparent as the description proceeds. Rotatable in said ears 26 is a rod 27, to opposite ends of which are secured long links 28 which, in the closed position of the plate 16, extend obliquely and are pivotally connected as at 29 to the sides of the trough 2 at a point above short links 23. It can now be seen that when handle 22 of bell crank lever 20 is swung from the position shown in Fig. 2 to the position shown in Fig. 3, said plate 16 will be swung to a substantially vertical position close to that end of opening 15 which is removed from direction of conveying of material so that a relatively large-size opening is provided for the discharge of material when said plate 16 is swung to the position shown in Figs. 3 and 4. It is to be noted that said bell crank lever 20 and links 28 provide, in effect, a toggle linkage to lock plate 16 in closed position against inadvertent opening. With the pivot of rod 27 located close to the edge of the opening 15 which the portion 18 of said plate underlies, the weight of the material being conveyed cannot tilt or swing the plate to open position.

In order to yieldably hold said gate 14 in closed position and also in open position, an over-center spring means is employed, herein comprising a tension spring 30 which has its opposite ends hooked through an ear 31 on the trough and a ring 32 on the handle 22 at a point radially spaced from the axis of the shaft portion 21. Accordingly, the tension in the spring 30 will tend to rotate the handle portion 22 of the bell crank lever 20 in a counter-clockwise direction whereby the rod 24 acting through the ears 25 tends to pull the overlying portion 17 of plate 16 downwardly and the toggle action maintains the underlying portion 18 of said plate 16 tight up against the underside of the trough 2. Now, when the handle portion 22 is swung in clockwise direction, the ring 32 thereof will be below the axis of the shaft portion 21 so that the tension in the spring 30 yieldably holds the gate 14 in passage opening position. In this way, the vibration of trough 2 will not disturb the position of gate 14, whereupon said gate will remain in either the open or closed position to which it has been moved by swinging the handle portion 22 of the bell crank lever 20.

Other modes of applying the principle of the invention may be employed, change being made as regards the details described, provided the features stated in any of the following claims, or the equivalent of such, be employed.

I therefore particularly point out and distinctly claim as my invention:

1. In combination, a conveyor trough having an opening in the bottom thereof, a plate spanning such opening, and a pair of links pivotally connected to spaced-apart points under said plate and to spaced-apart points on the outside of said trough for swinging downwardly of one link and the corresponding end of said plate and for swinging upwardly of the other link and the corresponding end of said plate through such opening to thus tilt said plate for discharge of material conveyed by said trough through such opening.

2. In combination, a conveyor trough having an opening in the bottom thereof, a plate spanning such opening, and a pair of links pivotally connected to spaced-apart points under said plate and to spaced-apart points on the outside of said trough for swinging downwardly of one link and the corresponding end of said plate and for swinging upwardly of the other link and the corresponding end of said plate through such opening to thus tilt said plate for discharge of material conveyed by said trough through such opening, said one link extending obliquely upward from said plate when the latter is in opening spanning position.

3. In combination, a conveyor trough having an opening in the bottom thereof, a plate spanning such opening, and a pair of links pivotally connected to spaced-apart points under said plate and to spaced-apart points on the outside of said trough for swinging downwardly of one link and the corresponding end of said plate and for swinging upwardly of the other link and the corresponding end of said plate through such opening to thus tilt said plate for discharge of material conveyed by said trough through such opening, said other link being pivotally connected to a point underneath said trough for upward swinging through such opening.

4. In combination, a conveyor trough having an opening in the bottom thereof, a plate spanning such opening, and a pair of links pivotally connected to spaced-apart points under said plate and to spaced-apart points on the outside of said trough for swinging downwardly of one link and the corresponding end of said plate and for swinging upwardly of the other link and the corresponding end of said plate through such opening to thus tilt said plate for discharge of material conveyed by said trough through such opening, the spaced-apart points of said trough to which said one link and said other link are pivotally connected being respectively above and below the bottom of said trough.

5. In combination, a conveyor trough having an opening in the bottom thereof, a plate spanning such opening, and a pair of links pivotally connected to spaced-apart points under said plate and to spaced-apart points on the outside of said trough for swinging downwardly of one link and the corresponding end of said plate and for swinging upwardly of the other link and the corresponding end of said plate through such opening to thus tilt said plate for discharge of material conveyed by said trough through such opening, said links when thus swung being disposed in generally vertical position closer to one marginal end of such opening than to the opposite marginal end whereby a major portion of the area of the opening from the opposite marginal end to the tilted plate is available for free discharge of conveyed material.

6. In combination, a conveyor trough having an opening in the bottom thereof, a plate spanning such opening, a pair of links pivotally connected to spaced-apart points under said plate and to spaced-apart points on the outside of said trough for swinging downwardly of one link and the corresponding end of said plate and for swinging upwardly of the other link and the corresponding end of said plate through such opening to thus tilt said plate for discharge of material conveyed by said trough through such opening, and over-center spring means acting on one of said links to yieldably hold said plate in either its opening spanning position or its tilted position.

References Cited in the file of this patent

UNITED STATES PATENTS

| | | |
|---|---|---|
| 2,185,214 | Claude-Mantle | Jan. 2, 1940 |
| 2,386,717 | Sample | Oct. 9, 1945 |
| 2,516,196 | Fowler | July 25, 1950 |
| 2,628,385 | Rogers | Feb. 17, 1953 |